(12) United States Patent
Griffin et al.

(10) Patent No.: US 11,665,003 B1
(45) Date of Patent: *May 30, 2023

(54) TIME-BASED DIGITAL SIGNATURE

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/163,045

(22) Filed: Jan. 29, 2021

Related U.S. Application Data

(63) Continuation of application No. 16/220,798, filed on Dec. 14, 2018, now Pat. No. 10,911,243.

(51) Int. Cl.
*H04L 29/06* (2006.01)
*H04L 9/32* (2006.01)
*G06F 9/54* (2006.01)
*H04L 9/40* (2022.01)

(52) U.S. Cl.
CPC ............ *H04L 9/3247* (2013.01); *G06F 9/542* (2013.01); *H04L 9/321* (2013.01); *H04L 9/3236* (2013.01); *H04L 9/3297* (2013.01); *H04L 63/123* (2013.01); *H04L 2209/60* (2013.01)

(58) Field of Classification Search
CPC ........ G06F 21/64; G06F 21/645; G06F 9/542; H04L 63/12; H04L 63/1433; H04L 63/20; H04L 9/3247; H04L 9/321; H04L 9/3236; H04L 9/3297; H04L 63/123; H04L 2209/60; G06N 20/20; G06N 5/003
See application file for complete search history.

(56) References Cited

U.S. PATENT DOCUMENTS

| | | | |
|---|---|---|---|
| 9,690,690 B1 | 6/2017 | Henriksen | |
| 2002/0161721 A1 | 10/2002 | Yuan et al. | |
| 2004/0052377 A1 | 3/2004 | Mattox et al. | |
| 2005/0216531 A1* | 9/2005 | Blandford | G06F 21/64 |
| 2007/0147610 A1 | 6/2007 | Kethi Reddy | |

(Continued)

OTHER PUBLICATIONS

ETSI SR 019 510 V1.1.1 (May 2017)"Electronic Signatures and infrastructures (ESI); Scoping study and framework for standardization of long-term data preservation services, including preservation of/with digital signatures" 57 pages.

*Primary Examiner* — Malcolm Cribbs
(74) *Attorney, Agent, or Firm* — Foley & Lardner LLP

(57) ABSTRACT

A method includes receiving an event, the event associated with a digital signature in a first time-based message comprising a first trusted time stamp token generated using a first hash of digitally signed content from a trusted timing authority; generating a first block on a distributed ledger; generating a second hash of the first trusted time stamp token; receiving a second trusted time stamp token from the trusted timing authority in response to transmitting the second hash to the trusted timing authority; and generating a second block on the distributed ledger; wherein verification of data integrity of the digitally signed content is provided via the first hash of the digitally signed content and second hash of the first trusted time stamp token and via the hash of the first block and a hash of the second block.

20 Claims, 4 Drawing Sheets

(56) References Cited

U.S. PATENT DOCUMENTS

| | | |
|---|---|---|
| 2008/0229113 A1 | 9/2008 | Yagawa |
| 2012/0089841 A1 | 4/2012 | Boyer et al. |
| 2016/0036825 A1* | 2/2016 | Manroa ............... H04L 63/0892 726/1 |
| 2018/0322312 A1 | 11/2018 | Olrog |

* cited by examiner

TIME-BASED DIGITAL SIGNATURE

CROSS-REFERENCE TO RELATED APPLICATIONS

This application is a continuation of U.S. patent application Ser. No. 16/220,798, filed Dec. 14, 2018 and entitled "TIME-BASED DIGITAL SIGNATURE," the contents of which are incorporated herein in their entirety and for all purposes.

BACKGROUND

Digital signatures are mathematical schemes for demonstrating the data integrity and origin authenticity of digital messages or electronic documents. A variety of cryptographic techniques are used to encrypt data and to create digital signatures. A Certificate Authority ("CA") is an entity trusted by one or more other entities to create and assign digital certificates. The CA can include multiple CAs issuing digital certificates, including a root CA (e.g., trust anchor), at least one intermediate CA, and an issuing CA. A digital certificate is an electronic document used to prove ownership of a public key. Digital certificates, also known as public key certificates, include the public key and the identity of an entity. Digital certificates are issued by a CA, which signs the digital certificate with the CA private key to render the digital certificate unforgeable, allowing for secure transactions between entities using the digital certificate. A Certificate Revocation List ("CRL") is a list of digital certificates that have been revoked by the issuing CA before their scheduled expiration date and should no longer be trusted. CRLs are a type of blacklist used by various endpoints, including Web browsers, to verify whether a certificate is valid and trustworthy.

A public key infrastructure ("PKI") is a set of roles, policies, and procedures used to create, manage, use, store, and revoke digital certificates and manage cryptographic keys (e.g., public key encryption). A PKI facilitates secure electronic transfer of information for various electronic activities (e.g., internet banking, e-commerce, etc.). A PKI binds public keys with respective identities of entities (e.g., individuals, companies, organizations) through registration and issuance of digital certificates by a CA. A PKI creates, stores, and distributes the digital certificates, which verify that a particular public key belongs to a certain entity.

A recipient of a message that has been digitally signed can use the digital signature to verify the identity of the message sender and confirm that the message has not been altered during transit. In a typical digital signature arrangement, a sender uses a cryptographic hash function to produce a hash (e.g., message digest); the hash is much smaller than the original message and is relatively unique to the message. The sender then uses its private key to generate the digital signature on the hash. The process of generating the digital signature (signing the message) uses a mathematical operation that can only be performed by the sender who possesses the private key. The message and the digital signature can then be sent to a recipient. As will be appreciated, the recipient is an entity that can use the digital signature and the message sender's public key (e.g., encapsulated in a certificate) to determine that the sender is the message signer (to verify origin authenticity) and that the message has not been compromised (to verify data integrity).

SUMMARY

Various embodiments relate to a method performed by a processor of a computing system. An example method includes receiving, by a computing system, an event. The event is associated with a digital signature in a first time-based message. The event signals a change to a property of the digital signature. The first time-based message includes a first trusted time stamp token from a trusted timing authority. The first trusted time stamp token is generated using a first hash of digitally signed content, the digitally signed content generated by digitally signing content. The first time-based message is retrieved. A second hash of the first trusted time stamp token is generated. The second hash is transmitted to a trusted timing authority. A second trusted time stamp token is received from the trusted timing authority in response to transmitting the second hash. A second time-based message is generated that includes the second trusted time stamp token. The data integrity of content can be verified via the first hash of the content and second hash of the first trusted time stamp token.

Another example embodiment relates to a method performed by a processor of a computing system. An example method includes receiving, by a computing system, an event. The event is associated with a digital signature in a first time-based message. The event signals a change to a property of the digital signature. The first time-based message includes a first trusted time stamp token from a trusted timing authority. The first trusted time stamp token is generated using a first hash of digitally signed content, the digitally signed content generated by digitally signing content. The first time-based message is retrieved. The content is digitally signed with a second digital signature to generate a second digitally signed content. A second hash of the first trusted time stamp token and the second digitally signed content is generated. The second hash is transmitted to a trusted timing authority. A second trusted time stamp token is received from the trusted timing authority in response to transmitting the second hash. A second time-based message is generated that includes the second trusted time stamp token. The data integrity of content can be verified via the first hash of the content and second hash of the first trusted time stamp token.

Another example embodiment relates to a method performed by a processor of a computing system. An example method includes receiving, by a computing system, an event. The event is associated with a digital signature in a first time-based message. The event signals a change to a property of the digital signature. The first time-based message includes a first trusted time stamp token from a trusted timing authority. The first trusted time stamp token is generated using a first hash of digitally signed content, the digitally signed content generated by digitally signing content. The first time-based message is retrieved. The first time stamp token is digitally signed with a second digital signature to generate a digitally signed first time stamp token. A second hash of the digitally signed first time stamp token is generated. The second hash is transmitted to a trusted timing authority. A second trusted time stamp token is received from the trusted timing authority in response to transmitting the second hash. A second time-based message is generated that includes the second trusted time stamp token. The data integrity of content can be verified via the first hash of the content and second hash of the first trusted time stamp token.

These and other features, together with the organization and manner of operation thereof, will become apparent from the following detailed description when taken in conjunction with the accompanying drawings, wherein like elements have like numerals throughout the several drawings described below.

Figure 1:
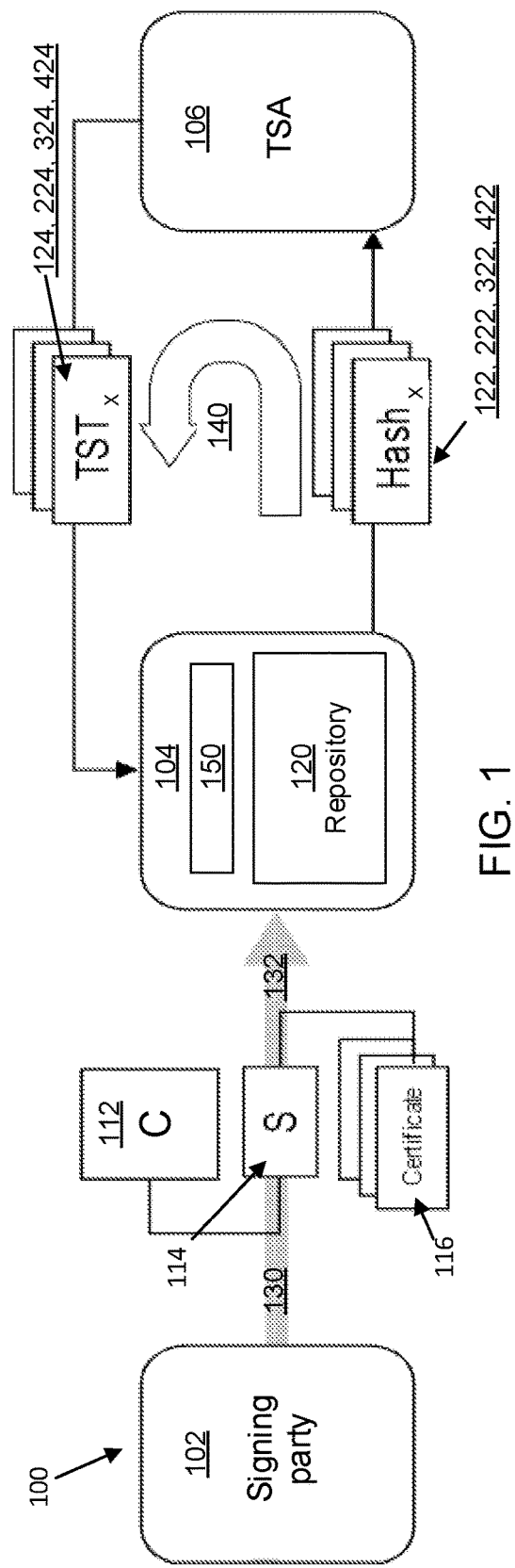
FIG. 1 is a functional block diagram of a time-based digital signature system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

In order to protect sensitive information cryptography, PKIs, and digital signatures are used to securely transmit and validate data integrity of the sensitive information. However, long-term retention of digitally signed data is difficult as cryptographic keys have limited periods where the underlying cryptography are valid, PKI certificates expire or are revoked, digital signature algorithms change, hash algorithms change, keys are revoked, and underlying schemas may change or become compromised over time. There are many reasons cryptographic algorithms and digital signature schemas may change, for example: discovering vulnerabilities, developing superior characteristics, or adapting to new security standards and policies. Accordingly, many current electronic signatures solutions are based on technology that cannot sustain itself over a cryptographic transition as the original data is re-signed using different keys, such that continuity and data integrity relies wholly on system or application logs. Thus, changes to the cryptography applied or digital signature schema used must be properly implemented to continue to protect the long-term signed data but retain signed data integrity. In other words, there is a need for a mechanism to provide data continuity for long-term retention periods that do not lend themselves to cryptographic solutions and/or rely on non-cryptographic cyber-security methods (e.g., access controls, logs, etc.)

Various embodiments described herein relate to systems and methods for a time-based digital signature system. Generally, the time-based digital signature system provides a crypto-based solution using reliable standards-based methods to provide data continuity for long-term retention periods. Using a time-based digital signature message, signed data may be refreshed, signed, and/or re-signed to retain overall continuity of the original signed data. This time-based digital signature system provides data integrity and origin authenticity for signed data through long-term retention. As will be appreciated, the time-based digital signature message data can be verified at any point in the long-term retention and provides a record of where the data was compromised or changed, thereby enabling the detection of the problem point.

The time-based digital signature system is structured to generate, monitor, and refresh signed data to retain the overall continuity of the original signed data. The time-based digital signature may include the signature and corresponding PKI credentials for a wide variety of certificates (e.g., X509). The time-based digital signature system may utilize a variety of extensions to the cryptographic techniques defined in the ANSI X9.73, ANSI X9.79, ITU-T Recommendation X.894, ANSI X9.95, ISO 21188, or other Cryptographic Message Syntax ("CMS") Standard. In some embodiments, the time-based digital signature system receives signed data and other information and submits a hash of the data to a Trusted Time Authority or Time Stamp Authority ("TSA") to get a first Time Stamp Token ("TST"). The time-based digital signature system utilizes the first TST and the signed data to generate a time-based digital signature message. When an event necessitates an update to the time-based digital signature message, the time-based digital signature system facilitates the generation of a second TST and generates a second time-based digital signature message. In some embodiments, a second data signature (subsequent from the first data signature in the underlying content) is added to the first TST using a second TST. In some embodiments, a combined hash of the first TST and the second signature information is used to retain the overall continuity of the first (e.g., original) and second signature. In some embodiments, a second signature is needed on the previously signed time-based digital signature message. The second signature is added onto the first TST, and a combined hash of the first TST and the second signature information is used to generate the second time-based digital signature message to retain the overall continuity of the underlying content.

In some embodiments, the time-based digital signature system may utilize SignedData, detached SignedData, and SigncryptedData message schema, each of which provides unique functionality. Generally, the digital signature process is also referred to as "signing a message digest." The message digest includes hash values that represent the specific, digitally signed time-based digital signature messages in the time-based digital signature system. A message digest is assigned to particular data content such that a change to any of the content within a time-based digital signature message will be reflected in the message digest. In some arrangements, the message digest includes a direct signature that does not first hash the information to be protected before signing the content. In some arrangements, a signature key that includes a set of private data elements specific to an entity and usable only by this entity in the signature process may be used for the digital signature process. Beneficially, under the CMS message type Signed- Data, there may be more than one message signer, each using a different public-private key pair and signature algorithm.

Referring generally to the use of the SignedData schema, a SignedData message is generated at each step in the time-based digital signature message encapsulation. Each successive step in the processing chain wraps another SignedData message around the previous message, and additional attributes can be added to the SignedData messages at each step. Using the detached SignedData schema, a hash of the time-based digital signature message is signed at each step in the processing chain and is transmitted out-of-band. As will be appreciated, the actual processing message content is not present, which maintains confidentiality throughout the process. With SignedData or detached SignedData, each financial institution can perform recursive descent at each step in the time-based digital signature message encapsulation to validate the integrity of each layer of the time-based digital signature message at each step.

As will be appreciated, the time-based digital signature system may be used to verify digital signatures in connection with secure communications, funds transfers, e-commerce transactions, or other digitally signed messages (e.g., cloud-based, blockchain-based, distributed ledgers, or smart contract systems) and to ensure that the signed data is updated and secured for long-term retention. The systems and methods address the requirement to protect data for long term retention even when it is stored in a publicly accessible environment, such as the cloud or within a blockchain, distributed ledger, and/or smart contracts, in a flexible way that is file and data-element neutral. In some embodiments, a signed smart contract relies on a certificate that expires requiring that the same key is certified (e.g., renewal) in a new certificate and "wraps" over the initial signature. To provide integrity, authentication, and non-repudiation, the time-based digital signature messages are bound by a TST and, in some embodiments, digitally signed by the time-based digital signature system.

The time-based digital signature system provides technical solutions to computer-centric and internet-centric problems associated with conventional message systems. By having the signed data encapsulated in a TST, a compromised aspect of the underlying cryptography or digital signature will be "protected" by being encapsulated in an up-to-date TST and/or digital signature. Accordingly, forensic analysis on a time-based digital signature message along the time-based digital signature message chain would ascertain when the time-based digital signature message was altered. Through digital signature verification and path validation, the time-based digital signature system provides a simple, yet effective, mechanism for protecting, monitoring, and updating a time-based digital signature message.

Further, the methods and systems described herein alleviate the strain on processing power and memory components currently required to manage, store, and authenticate signed data during long-term storage. The time-based digital signature system allows for the integration for encryption and signature schemes efficiently without sacrificing each scheme's security. In some embodiments, the time-based digital signature system utilizes a signed attributes feature to provide for an easy and lightweight mechanism to bind additional information to message. Accordingly, time-based digital signature system can be easily adapted to support new financial institution applications and security requirements. Additionally, making use of a TST from a TSA enables a relying party to determine when a message was digitally signed and that it is "fresh" (e.g., that the sample is not from an unauthorized party along the processing chain). Beneficially, the time-based digital signature system may implement a unique utilization of extensions to SignedData processing. The unique utilization of extensions to SignedData processing do not prohibit the use of currently deployed, long-term retention-vulnerable signature schemes. The time-based digital signature system provides a more efficient and effective authentication mechanism, alleviating processing power and network congestions, as the time-based digital signature system does not require moving the current signature systems to what are believed to be safe algorithms. Beneficially, the time-based digital signature system operates within the deployed signature schemes while allowing the data to be proactively resistant and providing origin authenticity and data integrity to a message during long-term retention.

These problems arise out of the use of computers and the internet because each problem involves processing power, bandwidth requirements, storage requirements, and information security, each of which is inherent to the use of computers and the internet. The problems also arise out of the use of computers and the internet, because online communications, transactions, and payment services and the ability to properly store signed data and/or an online communication cannot exist without the use of computers and the Internet.

Referring to FIG. 1, a functional block diagram of a time-based digital signature system 100 is illustrated, according to an example embodiment. The time-based digital signature system 100 is used to generate a time-based digital signature message by facilitating and storing a TST that includes the signed data 110. The time-based digital signature system 100 is structured to update the time-based digital signature message upon the occurrence of an event requiring the time-based digital signature message to be updated through the generation method 140. By wrapping the time-based digital signature message in one or more TSTs and in a digital signature, the data integrity and origin authenticity of the underlying signed data 110 can be evaluated at each step along the time-based digital signature message. As shown in FIG. 1, the time-based digital signature system 100 includes a signing party 102 (e.g., signer), signed data 110, a time-based digital signature computing system 104, and a TSA 106. The TSA 106 is managed by a TSA or time authority.

The process of using the time-based digital signature system 100 begins when the signing party initiates a digital signature process 130 on content 112 (e.g., message, data, etc.) to generate signed data. The signed data 110 includes the content 112 cryptographically bound under a digital signature 114 (e.g., a first digital signature). The digital signature 114 may be generated using a wide variety of digital signature algorithms and/or key pairs. A variety of cryptographic techniques are used to encrypt data and to create digital signatures 114. With symmetric key cryptographic systems, a pair of users who desire to exchange data securely use a shared "symmetric" key. With this type of approach, the signing party 102 of the signed data 110 uses the same key to encrypt the message that a recipient of the message uses to decrypt the message. Symmetric key systems require that each sender and recipient establish the shared key in a secure manner. Public key systems (e.g., asymmetric key cryptography) may also be used to exchange messages securely. With public-key cryptographic systems, two types of keys are used—public keys and private keys. A signing party 102 of the signed data 110 may encrypt the message using the public key of a recipient. The recipient may use a corresponding private key to decrypt the message.

The X.509 extension mechanism in version 3 allows the X.509 to be extended by anyone with a need without requiring any change whatsoever to the X.509 standard. These "protocol holes" are a free form, open ended location that a user of the protocol can fill in with anything they need or that suits them. Each extension is a package containing an identifier of its content (e.g., the extension payload) and the extension content. The content may be of any type of data and of any kind or format. Additionally, X.509 has two Distinguished Names ("DN") in every certificate, one DN for the certificate subject and another DN for the certificate issuer, implemented as a set of attributes. The X.509 DNs can be cryptographically bound by a digital signature of the certificate issuer. In some embodiments, the certificates 116 may be provided as signed attributes that can serve the same function in an identity management context as "signed claims" or "signed assertions" provided using assertions.

In some arrangements, the certificate 116 is a "sequence" type containing a component that is the content-to-be-signed, the digital signature on the content-to-be-signed component, and information indicating the signing party's public key, the digital signature algorithm used, and additional parameters used to form the signed data 110. In other arrangements, the digital signature of the signed data 110 is in the form used to sign X.509 attributes. The attributes can be used, for example, to identify a particular transaction type or entity, such as a credit card service provider. In some arrangements, each signed data 110 could be entity-specific, with each signed data 110 including as an attribute an identifier of the associated entity. In some arrangements, the key pair is associated with a certificate 116 in a PKI.

The singing party 102 transmits 132 the signed data 110 to the time-based digital signature computing system 104. In some embodiments, the signing party 102 may have an account or be enrolled in services provided by the time-based digital signature computing system 104. The time-based digital signature computing system 104 receives the signed data 110 and begins the time-based digital signature generation method 140 of the first time-based digital signature message 150. The generation method 140 begins with the time-based digital signature computing system 104 generating a hash 122 of the signed data 110 information. In some embodiments, the hash 122 includes the entire signed data 110. In other embodiments, the hash 122 includes the underlying content 112 bound under the digital signature 114 without the certificate(s) 116. Notably, the digital signature process 130 and the generation method 140 may not utilize a merkle tree and may be algorithm agnostic. The time-based digital signature computing system 104 transmits the hash 122 to the TSA 106 with a request to the TSA 106 to generate a TST.

The TSA 106 may be in communication with a plurality of time source entities, such as the International Time Authority, the National Measurement Institute, and a Master Clock. The TSA 106 may use the time source entities to generate multiple TSTs, each corresponding to a time source entity, or the TSA 106 may determine a time consensus for which to generate a single TST. The TSA 106 generates a first TST ($TST_1$) 124 and returns it to the time-based digital signature computing system 104 to associate the first TST 124 with the signed data 110. The first TST 124 allows a verifying entity to compare the hash of the information data entry to the information data entry to verify that they correspond to the same information and, because the time stamping authority is trusted, that the information data entry was generated at the time indicated on the time stamp.

The time-based digital signature computing system 104 receives the first TST 124 from the TSA 106. The time-based digital signature computing system 104 stores the first time-based digital signature message 150, which includes only the first TST 124 at this time, in a repository 120. In some embodiments, the first time-based digital signature message 150 is digitally signed by the time-based digital signature computing system 104. In those embodiments, the digital signature process may not utilize a Merkle tree and may be algorithm agnostic. The repository may reside on a local device, a server or mainframe based service, a third party server, or similar storage locations. The time-based digital signature computing system 104 may be configured to catalogue and identify the various aspects (e.g., digital signature schemas, cryptography, CRLs, etc.) of each signed data 110 in the repository 120. In some embodiments, the time-based digital signature computing system 104 is configured to monitor the various aspects (e.g., digital signature schemas, cryptography, CRLs, etc.) of all signed data messages within the repository 120. In other embodiments, a third-party is configured to monitor the various aspects (e.g., digital signature schemas, cryptography, CRLs, etc.) that are implemented within at least on the signed data messages within the repository 120.

Upon the occurrence of an event (e.g., compromise or changes to the cryptography applied or digital signature schema), the time-based digital signature computing system 104 facilitates an update of the first time-based digital signature message 150. Beneficially, the time-based digital signature computing system 104 can identify a change to an aspect and identify which signed data messages in the repository 120 are affected by the change. The time-based digital signature computing system 104 retrieves the first time-based digital signature message 150 that includes the signed data 110 and initiates the generation method 140 to generate a second time-based digital signature message 200.

The generation method 140 begins again with the time-based digital signature computing system 104 generating a hash 222 of the first TST 124. The time-based digital signature computing system 104 transmits the hash 222 to the TSA 106 with a request to the TSA 106 to generate a second TST ($TST_2$) 224. The TSA 106 generates a second TST 224 and returns it to the time-based digital signature computing system 104. The second TST 224 allows a verifying entity to compare the hash of the information data entry to the information data entry to verify that they correspond to the same information and, because the time stamping authority is trusted, that the information data entry was generated at the time indicated on the time stamp.

Figure 2:
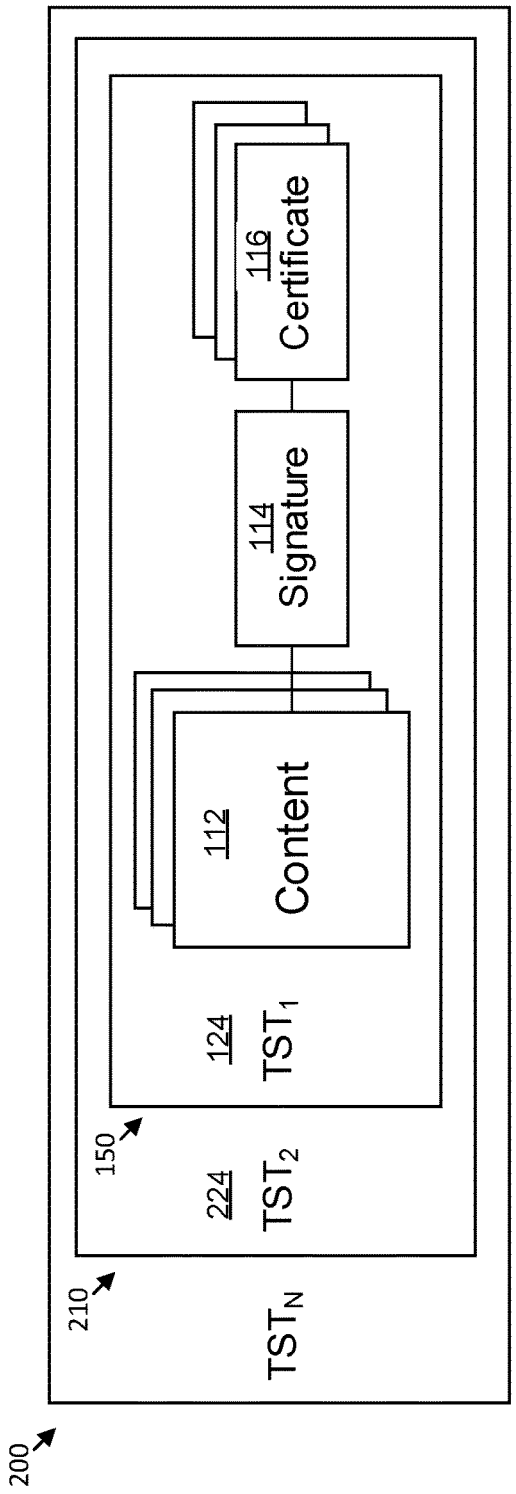
FIG. 2 is a schematic diagram of a time-based digital signature message that may be implemented with the time-based digital signature system of FIG. 1, according to an example embodiment.

The time-based digital signature computing system 104 receives the second TST 224 from the TSA 106. The time-based digital signature computing system 104 stores the second time-based digital signature message 210, which the first TST 124 and the second TST 224 at this time, in a repository 120. In some embodiments, the second time-based digital signature message 210 is digitally signed by the time-based digital signature computing system 104. The second time-based digital signature message 210 is shown in FIG. 2. The event occurrence and generation method 140 may occur multiple times to create an N-th TST with (N-1) TSTs nested within to form an N-th time-based digital signature message 200, as shown in FIG. 2.

Figure 3:
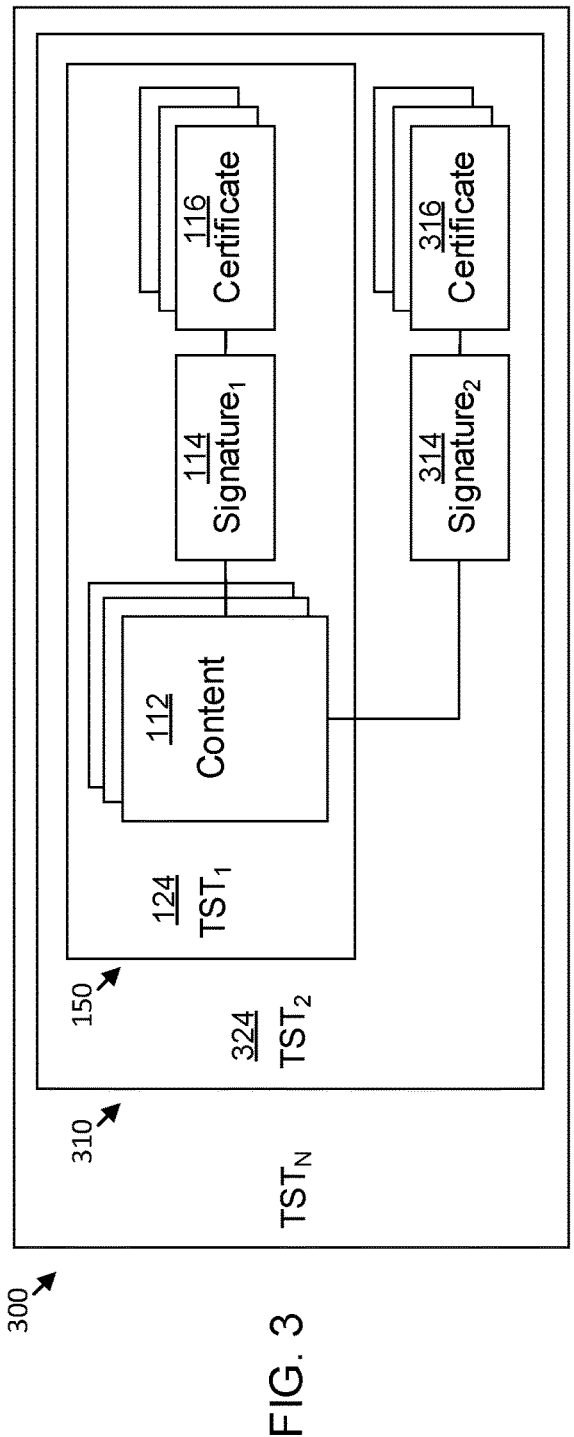
FIG. 3 is a schematic diagram of a time-based digital signature message that may be implemented with the time-based digital signature system of FIG. 1, according to another example embodiment.

In some embodiments, the time-based digital signature computing system 104 generates a second TST using a time-based resign message 300 shown in FIG. 3. A difference between the time-based resign message 300 and the second time-based digital signature message 200 is that the time-based resign message 300 generates a second signature. Upon the occurrence of an event, the time-based digital signature computing system 104 facilitates an update of the first time-based digital signature message 150. The time-based digital signature computing system 104 retrieves the first time-based digital signature message 150, including the signed data 110, and initiates the generation method 140 to generate a time-based resign message 300.

The generation method 140 for the time-based resign message 300 begins with the time-based digital signature computing system 104 generating a second digital signature 314 (Signatures) on the content 112 of the original signed data 110. In some embodiments, the second digital signature 314 is generated by the time-based digital signature computing system 104 digitally signing the original content 112 using a key pair of the time-based digital signature computing system 104. In other embodiments, the time-based digital signature computing system 104 facilitates the signing party 102 providing the second digital signature 314. The second digital signature 314 includes certificate 316 associated with the second digital signature 314.

The time-based digital signature computing system 104 generates a combined hash 322 of the first TST 124 and the second digital signature 314 to retain the overall continuity of the original and second signatures 114, 314. The time-based digital signature computing system 104 transmits the hash 322 to the TSA 106 with a request to the TSA 106 to generate a second TST (TST$_2$) 324. The TSA 106 generates a second TST 324 and returns it to the time-based digital signature computing system 104. The second TST 324 allows a verifying entity to compare the hash of the information data entry to the information data entry to verify that they correspond to the same information and, because the time stamping authority is trusted, that the information data entry was generated at the time indicated on the time stamp.

The time-based digital signature computing system 104 receives the second TST 324 from the TSA 106. The time-based digital signature computing system 104 stores the second time-based digital signature message 310, which includes the first TST 124 and the second TST 324 at this time, in a repository 120. In some embodiments, the second time-based digital signature message 310 is digitally signed by the time-based digital signature computing system 104. In those embodiments, the digital signature process may not utilize a merkle tree and may be algorithm agnostic. The second time-based digital signature message 310 is shown in FIG. 3. The event occurrence and generation method 140 may occur multiple times to create an N-th TST with (N-1) TSTs nested within to form an N-th time-based resign message 300, as shown in FIG. 3. As will be appreciated, the generation method 140 of FIG. 2 and the generation method 140 of the time-based resign message 300 of FIG. 3 may be used interchangeably and/or in tandem to generate an N-th time-based digital signature with TSTs nested within.

Figure 4:
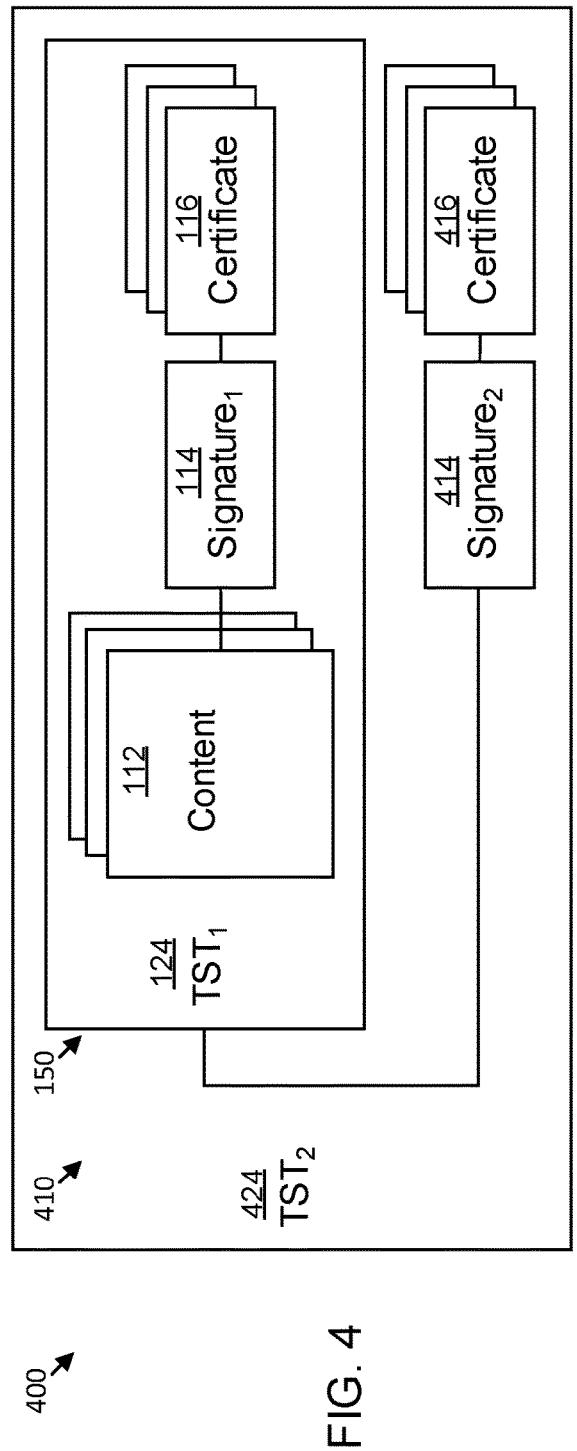
FIG. 4 is a schematic diagram of a time-based digital signature message that may be implemented with the time-based digital signature system of FIG. 1, according to a yet another example embodiment.

In other embodiments, the time-based digital signature computing system 104 generates a second TST 324 using a time-based resign signed message 400, as shown in FIG. 4. A difference between the time-based resign signed message 400 and the second time-based digital signature message 200 is that the time-based resign signed message 400 generates a second signature 414 (Signatures). Upon the occurrence of an event the time-based digital signature computing system 104 facilitates an update of the first time-based digital signature message 150. The time-based digital signature computing system 104 retrieves the first time-based digital signature message 150 that includes the signed data 110 and initiates the generation method 140 to generate a time-based resign signed message 400.

The generation method 140 for the time-based resign signed message 400 begins with the time-based digital signature computing system 104 generating the second digital signature 414 (Signatures) on the first TST 124. In some embodiments, the generation method 140 includes re-signing the signed data 110. In some embodiments, the second digital signature 414 is generated by the time-based digital signature computing system 104 digitally signing the original content 112 using a key pair of the time-based digital signature computing system 104. In other embodiments, the time-based digital signature computing system 104 facilitates the signing party 102 providing the second digital signature 414. The second digital signature 414 includes a certificate 416 associated with the second digital signature 414.

The time-based digital signature computing system 104 generates a combined hash 422 of the first TST 124 and the second digital signature 414 to retain the overall continuity of the original and second signatures 114, 414. The time-based digital signature computing system 104 transmits the hash 422 to the TSA 106 with a request to the TSA 106 to generate a second TST (TST$_2$) 424. The TSA 106 generates a second TST 424 and returns it to the time-based digital signature computing system 104. The second TST 424 allows a verifying entity to compare the hash of the information data entry to the information data entry to verify that they correspond to the same information and, because the time stamping authority is trusted, that the information data entry was generated at the time indicated on the time stamp.

The time-based digital signature computing system 104 receives the second TST 424 from the TSA 106. The time-based digital signature computing system 104 stores the second time-based digital signature message 410, which includes the first TST 124 and the second TST 424 at this time, in a repository 120. In some embodiments, the second time-based digital signature message 410 is digitally signed by the time-based digital signature computing system 104. In those embodiments, the digital signature process may not utilize a merkle tree and may be algorithm agnostic. The second time-based digital signature message 410 is shown in FIG. 3. The event occurrence and generation method 140 may occur multiple times to create an N-th TST with (N-1) TSTs nested within to form an N-th time-based resign signed message 400, as shown in FIG. 3. As will be appreciated, the generation method 140 of FIG. 2, the generation method 140 of the time-based resign signed message 400 of FIG. 3, and the generation method 140 of the time-based resign signed message 400 of FIG. 4 may be used interchangeably and/or in tandem to generate an N-th time-based digital signature with TSTs nested within.

Figure 5A:
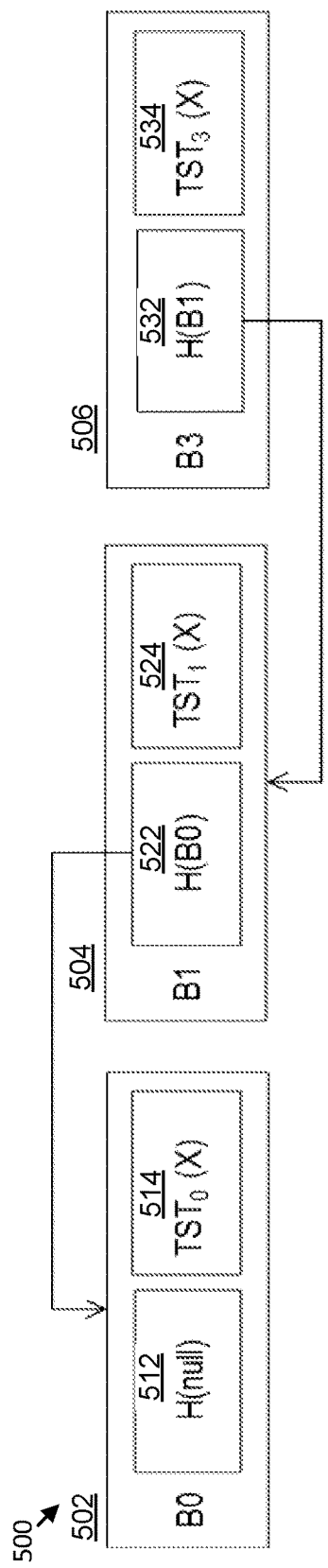
FIG. 5A is a functional block diagram of a time-based digital signature system implemented on a distributed ledger, according to an example embodiment.

In other embodiments, the based digital signature computing system 104 is used to generate a distributed ledger-based system. Turning to FIG. 5A, a distributed ledger time-based digital signature system 500 is shown, according to an example embodiment. The distributed ledger time-based digital signature system 500 may implement one of the methods described above with respect to FIGS. 1-4 to generate a time-based digital signature message. Generally, each block in the distributed ledger time-based digital signature system 500 may include a TST such that each subsequent block includes another encapsulated TST.

The distributed ledger time-based digital signature system 500 begins with the generation of a first block (B$_0$) 502 that includes a first TST 514 and a hash 512 of the signed data.

A second block (B$_1$) 504 is generated upon an occurrence of an event and includes the second TST 522 and a hash 522 of the first block. A third block (B$_2$) 506 is generated upon an occurrence of an event and includes the third TST 534 and a hash 532 of the second block. The generation of the first TST 514, second TST 522, and/or third TST 534 may be done using a method similar to generation method outlined above with respect to FIGS. 1-4.

Figure 5B:
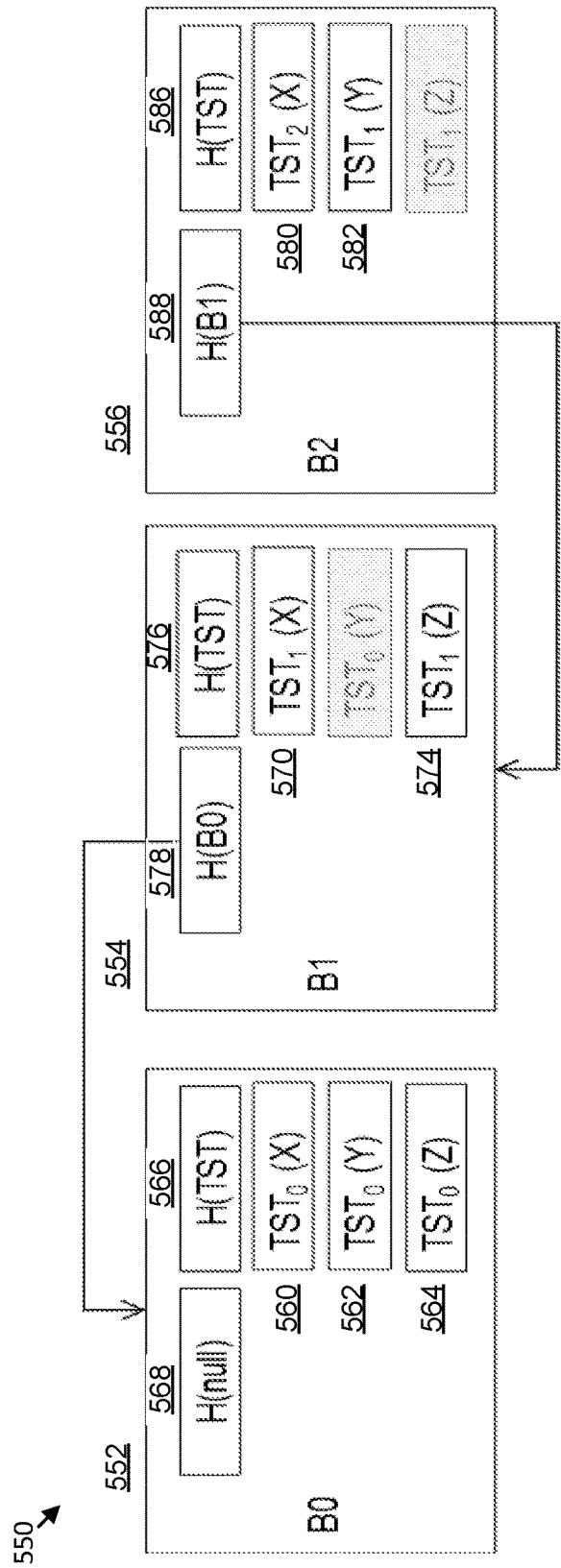
FIG. 5B is a functional block diagram of a time-based digital signature system implemented on a distributed ledger, according to another example embodiment.

Turning to FIG. 5B, a distributed ledger time-based digital signature system 550 with multiple signers is shown, according to an example embodiment. The distributed ledger time-based digital signature system 550 may implement a method described above, with respect to FIGS. 1-4, to generate a time-based digital signature message. Generally, each block in the distributed ledger time-based digital signature system 550 may include a TST such that each subsequent block includes another encapsulated TST. Beneficially, each organization need not sign a subsequent block if an update is not needed.

The distributed ledger time-based digital signature system 550 begins with the generation of a first block (B$_0$) 552 that includes a first entity first TST 560, second entity first TST 562, third entity first TST 564, a hash 566 of the collection of the first TSTs 560, 562, 564, and a hash 568 of the signed data. A second block (B$_1$) 554 is generated upon an occurrence of an event and includes the first entity second TST 570, third entity second TST 574, a hash 576 of the collection of the first entity second TST 570 and the third entity second TST 574, and a hash 578 of the first block. A third block (B$_2$) 556 is generated upon an occurrence of an event and includes the first entity third TST 580, second entity second TST 582, a hash 586 of the collection of the first entity third TST 580 and the second entity second TST 582, and a hash 588 of the second block. In some embodiments, the Signerinfo is used to identify the public key needed to verify the signature.

The Signerinfo may contain a pair of hash and pointer values that link and identify an associated blockchain. In some embodiments, the Signerinfo may contain an extended hash-pointer, which includes a hash, a pointer, and the type of data being pointed to, for example, an OID that identifies a distributed ledger block. The Signerinfo may first create a SignedData message that first serves as the first block in the associated blockchain and includes in that first associated blockchain block a preceding block attribute that points back to the parent blockchain's block (e.g., block N). The message digest of the content in that first block in the associated blockchain is the value used as "hash2" in Signerinfo.

Figure 6:
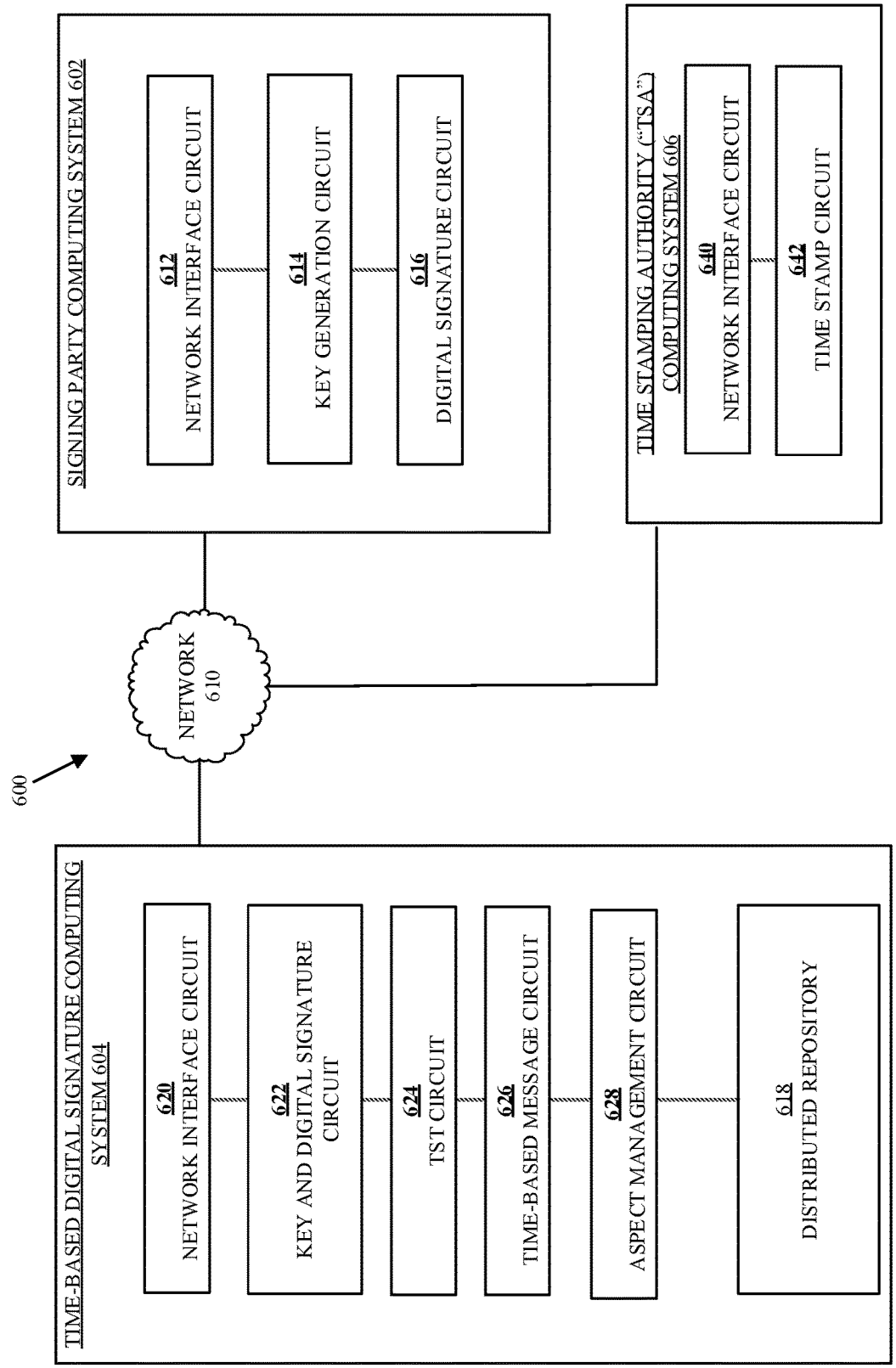
FIG. 6 is a schematic diagram of a time-based digital signature system, according to an example embodiment.

FIG. 6 is a schematic diagram of a time-based digital signature system 600, according to an example embodiment. The time-based digital signature system 600 includes a time-based digital signature computing system 604, a signing party computing system 602, and a TSA computing system 606. Each of the time-based digital signature computing system 604, the signing party computing system 602, and the TSA computing system 606 are in operative communication with the others via a network 610. According to various embodiments, the time-based digital signature system 600 may be utilized to implement the generation method 140 of FIG. 1 to generate the second time-based digital signature message 210 of FIG. 2, the time-based resign signed message 400 of FIG. 3, and the time-based resign signed message 400 of FIG. 4. The signing party computing system 602 may be managed by the signing party 102 of FIG. 1, the time-based digital signature computing system 604 may be managed by the time-based digital signature computing system 104 of FIG. 1, and the TSA computing system 606 may be managed by the TSA 106 of FIG. 1. Additionally, the time-based digital signature system 100 of FIG. 1 may be a part of the time-based digital signature system 600.

The signing party computing system 602 includes a network interface circuit 612, a key generation circuit 614, and a digital signature circuit 616. The network interface circuit 612 is structured to facilitate operative communication between the signing party computing system 602 and other systems and devices over the network 610. The signing party computing system 602 may include smartphones, tablet computing systems, laptop computing systems, desktop computing systems, PDAs, smart watches, smart glasses, tablets, tagged objects, RFIDs, etc.

The key generation circuit 614 is structured to generate a public/private key pair for the digital signature of a quantum-resistant message. In some arrangements the public/private key pair is associated with a digital certificate in a PKI, such as the X.509 certificate. In those arrangements, a key pair is generated (the private/public key pair must be generated together as they are mathematically related), the private key signs the public key, and the pair is summited to the CA or the front end registration authority that will then generate that public key certificate. Alternatively, the private/public key pair could be issued with a commercial CA, such as one associated with a financial institution. In some arrangements, the signing party computing system 602 retrieves a public key certificate from the commercial CA and uses the certificate to ascertain the public/private key pair. In other embodiments, the key generation circuit 614 generates an ephemeral public/private key pair that is not associated with a digital certificate in a PKI. The key generation circuit 614 may compile any certificates included in the signed data.

The digital signature circuit 616 is structured to generate the signed data by retrieving the key from the key generation circuit 614 and digitally signing (and, therefore, cryptographically binding) the content, and facilitating the generation of the signed data. The digital signature circuit 616 may manage the key generation circuit 614 and control the generation of key pairs according to the desired signed data (e.g., whether the key is associated with a PKI, CA, etc.). Once a key pair is generated, the digital signature circuit 616 determines what additional attributes (or OIDs) are to be bound to the message under the digital signature. The attributes can include, for example, a transaction identifier, a signing party identifier, a system generated time stamp, a public key, or a uniform resource identifier query string.

The digital signature circuit 616 can accommodate and facilitate a wide variety of quantum-resistant digital signature methods to sign the original message. In some arrangements, the digital signature is achieved using SignedData CMS to generate a SignedData message. With SignedData, there is no need to send the actual certificate along in the message; instead, an attribute or other identifier can indicate which certificate the recipient needs to verify the signature.

The TSA computing system 606 includes a network interface circuit 640 and a time stamp circuit 642. The TSA computing system 606 is managed by any trusted time authority that can provide a trusted time token for a piece of information or data entry. The trusted time authority can be one that complies with the X9.95 standard, or those defined in similar standards by ISO/IEC, IETF, and/or ETSI, and satisfies the legal and regulatory requirements. In some embodiments, the TSA computing system 606 may be contained in, and controlled by, the time-based digital signature computing system 102. The TSA computing system 606 may include, for example, one or more servers each with one or more processors configured to execute instructions stored in a memory, send and receive data stored in the memory, and perform other operations to implement the compliance services described herein associated with the processing modules, databases, and processes shown.

The time-based digital signature computing system 604 includes a network interface circuit 620, key and digital signature circuit 622, TST circuit 624, time-based message circuit 626, aspect management circuit 628, and a distributed repository 618. The time-based digital signature computing system 604 is configured to receive signed data, generate time-based digital signature messages, monitor event changes, and update time-based digital signature messages. The network interface circuit 620 is structured to facilitate operative communication between the time-based digital signature computing system 604 and other systems and devices over the network 610.

The key and digital signature circuit 622 is structured to verify the digital signature in a received signed data. In embodiments, where the time-based digital signature computing system 604 signs the time-based digital signature message, the key and digital signature circuit 622 facilitates digitally signing the time-based digital signature message. The key and digital signature circuit 622 may be structured to verify and/or sign a time-based digital signature message using the SignedData, detached SignedData, and SigncryptedData message schema, each of which provides unique functionality.

The TST circuit 624 is structured to communicate with the TSA computing system 606 to negotiate a trusted (e.g., recognized by regulators, auditors, members of the financial sector, etc. as a trustworthy time stamp) time stamp token for a piece of information. The TST circuit 624 is in communication with the time-based message circuit 626 to negotiate a trusted time stamp when an even occurs. Trusted time stamping provides authentication, integrity, and non-repudiation to the various data entries. In some arrangements, an information data entry is digitally signed by the generating entity (e.g., the time-based digital signature computing system 604) before it is sent to the TSA computing system 606. In some embodiments, the TST circuit 624 generates a hash of the information data entry using a hashing algorithm.

The TST circuit 624 submits the hash of the information data entry with a request to the TSA computing system 606 to generate a time stamp token. After submission of the request, the TST circuit 624 receives a trusted time stamp token from the TSA computing system 606. The TST may include the hash of the information data entry and the time the hash of the information data entry was received by the TSA computing system 606. The TST circuit 624 links the information data entry and the trusted time stamp token. The trusted TST allows a verifying entity to compare the hash of the information data entry to the information data entry to verify that they correspond to the same information and, because the TSA is trusted, that the information data entry was generated at the time indicated on the time stamp.

The time-based message circuit 626 is configured to receive, generate, and update the time-based digital signature messages. The time-based message circuit 626 is configured to generate a time-based digital signature message in a manner similar to the methods described in FIGS. 1-4. In some embodiments, the time-based message circuit 626 is configured to implement SignedData with the time-based digital signature message. In those embodiments, certificates and/or other information related to the time-based digital signature message may be included in a value of a SignerInfo attribute for inclusion. The SignerInfo may include the public key identifier of the public key or certificate associated with the public/private key pair of the signed data and/or time-based digital signature message and the resulting signature value.

In some embodiments, the time-based message circuit 626 the time-based digital signature message is completed using the Abstract Syntax Notation One ("ASN.1") type "SignedData." In those arrangements, a cryptographic hash is used to create the time-based digital signature message on the content-to-be-signed and any associated attributes carried in type SignedData. The hash is calculated using the hash algorithm and parameters specified by the time-based digital signature computing system 604, the content-to-be-signed, and any attributes that are to be cryptographically bound to the content. In some arrangements the TST is not part of the digital signature message. In other arrangements, the TST is included in "attributes" of the SignedData message. For example, both a SAML assertion and the TST could be included in the SignedData UnsignedAttributes field, as well as being cryptographically bound to the content. Alternatively, any SignedData content-to-be-signed (e.g., time-based digital signature message) can be "detached." The detached content is such that the signature in the SignedData message is performed over the content-to-be-signed, but that signed content is not included in the SignedData message, thereby being detached. However, the content-to-be-signed must be available when the SignedData signature is verified, since the signature verification process requires computing the hash over the content-to-be-signed.

Additionally, certificates to support the key management techniques can be included in a time-based digital signature message using the typed SignedData. The certificates component of type SignedData is a value of type "Certificates," which may contain a collection of one or more certificates. The certificates used in X9.73 are signed binary objects, whose digital signatures have been calculated over values encoded using the Distinguished Encoding Rules ("DER") of ASN.1 using schema defined for these types in other standards. In order to verify the signatures on these objects, their original encodings must be maintained, but these values must also be represented in XML markup in a useful textual format. Consequently, the values in the certificates component of type Certificates have been Base64-armored to minimize their size when represented using XML markup while preserving their original encodings. The input to the Base64 processing is defined in this Standard as a Basic Encoding Rules ("BER") encoded value of type SET OF CertificateChoices. Any combination of certificates, including X.509 certificates, attribute certificates and certificates supporting XML Advanced Electronic Signatures ("XAdES") may be included in the Certificates type, and they may appear in any order.

The aspect management circuit 628 is structured to catalogue and identify the various aspects (e.g., digital signature schemas, cryptography, CRLs, etc.) of each signed data and/or time-based digital signature message in the distributed repository 618. In some embodiments, the aspect management circuit 628 is configured to monitor the various aspects (e.g., digital signature schemas, cryptography, CRLs, etc.) of all signed data messages within the distributed repository 618 and transmit an event change and the event change information to the time-based message circuit 626.

The distributed repository 618 is structured to store time-based digital signature messages that are needed to managed and protect in long-term retention. In some arrangements, the distributed repository 618 stores an event entry generated by the time-based digital signature computing system 604. In some arrangements, the distributed repository 618 is a private blockchain.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits ("IC"), discrete circuits, system on a chip ("SOCs") circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor that, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits ("ASICs"), field programmable gate arrays ("FPGAs"), digital signal processors ("DSPs"), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed:

1. A method, comprising:
   receiving an event, the event associated with a digital signature in a first time-based message, the event signaling a change to a property of the digital signature,
   wherein the first time-based message comprises a first trusted time stamp token from a trusted timing authority, the first trusted time stamp token generated using a first hash of digitally signed content;
   generating a first block on a distributed ledger, the first block comprising the first trusted time stamp token and the first hash of digitally signed content;
   generating a second hash of the first trusted time stamp token;
   receiving a second trusted time stamp token from the trusted timing authority in response to transmitting the second hash to the trusted timing authority; and
   generating a second block on the distributed ledger, the second block comprising the second trusted time stamp token, the second hash of the first trusted time stamp token, and a hash of the first block,
      wherein verification of data integrity of the digitally signed content is provided via the first hash of the digitally signed content and second hash of the first trusted time stamp token and via the hash of the first block and a hash of the second block.

2. The method of claim 1, wherein the event comprises a first event, further comprising:
   receiving a second event, the second event associated with the digital signature in a second time-based message, the second event signaling a change to a property of the digital signature;
   retrieving the second time-based message, the second time-based message comprising the second trusted time stamp token;
   generating a third hash of the second trusted time stamp token;
   transmitting the third hash to the trusted timing authority;
   receiving a third trusted time stamp token from the trusted timing authority in response to transmitting the third hash;
   generating a third block on the distributed ledger, the third block comprising the third trusted time stamp token, the third hash of the second trusted time stamp token, and the hash of the second block; and
   generating a third time-based message, the third time-based message comprising the third trusted time stamp token.

3. The method of claim 1, wherein the first time-based message comprises a Signerinfo type that is an identifier of a digest algorithm used to generate the first hash.

4. The method of claim 1, wherein the first time-based message comprises a Signerinfo type that contains the hash of the first block and the hash of the second block.

5. The method of claim 1, wherein the first time-based message comprises a bundled certificate identifier comprises a signed attribute bound to the digitally signed content, the bundled certificate identifier comprising a certificate issuer and a certificate identifier.

6. The method of claim 1, further comprising generating, upon an occurrence of the event, an event journal entry, the event journal entry representing the occurrence of the event with the digitally signed content and comprises a signifier of the first time-based message associated with the event.

7. A method, comprising:
   receiving an event, the event associated with a first digital signature in a first time-based message, the event signaling a change to a property of the first digital signature,
   wherein the first time-based message comprises a first trusted time stamp token from a trusted timing authority, the first trusted time stamp token generated using a first hash of first digitally signed content, the first digitally signed content generated by digitally signing content;
   generating a first block on a distributed ledger, the first block comprising the first trusted time stamp token and the first hash of first digitally signed content;
   digitally signing the content with a second digital signature to generate a second digitally signed content;
   generating a second hash of the first trusted time stamp token and the second digitally signed content;
   receiving a second trusted time stamp token from the trusted timing authority in response to transmitting the second hash to the trusted timing authority; and
   generating a second block on the distributed ledger, the second block comprising the second trusted time stamp token, the second hash of the first trusted time stamp token and the second digitally signed content, and a hash of the first block,
      wherein verification of data integrity of the digitally signed content is provided via the first hash of the digitally signed content and second hash of the first trusted time stamp token and the second digitally signed content and via the hash of the first block and a hash of the second block.

8. The method of claim 7, wherein the event comprises a first event, further comprising:
   receiving a second event, the second event associated with the first digital signature in the first time-based message, the second event signaling a change to a property of the first digital signature;
   retrieving a second time-based message, the second time-based message comprising the second trusted time stamp token;
   digitally signing the content with a third digital signature to generate a third digitally signed content;
   generating a third hash of the second trusted time stamp token and the third digitally signed content;
   transmitting the third hash to the trusted timing authority;

receiving a third trusted time stamp token from the trusted timing authority in response to transmitting the second hash;

generating a third block on the distributed ledger, the third block comprising the third trusted time stamp token, the third hash of the second trusted time stamp token and the third digitally signed content, and the hash of the second block; and generating a third time-based message, the second time-based message comprising the third trusted time stamp token.

9. The method of claim 7, wherein the first time-based message comprises a Signerinfo type that is an identifier of a digest algorithm used to generate the first hash.

10. The method of claim 7, wherein the first time-based message comprises a Signerinfo type that contains the hash of the first block and the hash of the second block.

11. The method of claim 7, further comprising generating a second time-based message, the second time-based message comprising the second trusted time stamp token,
wherein the second time-based message comprises a bundled certificate identifier that comprises a signed attribute bound to the digitally signed content, the bundled certificate identifier comprising a certificate issuer and a certificate identifier.

12. The method of claim 7, wherein digitally signing the content with the second digital signature further comprises: transmitting the content to a signer computing system that generated the first digitally signed content, and receiving the digitally signed content, digitally signed by the signer computing system.

13. The method of claim 7, further comprising generating, upon an occurrence of the event, an event journal entry, the event journal entry representing the occurrence of the event with the digitally signed content and comprises a signifier of the first time-based message associated with the event.

14. A method, comprising:
receiving an event, the event associated with a first digital signature in a first time-based message, the event signaling a change to a property of the first digital signature,
wherein the first time-based message comprises a first trusted time stamp token from a trusted timing authority, the first trusted time stamp token generated using a first hash of first digitally signed content, the first digitally signed content generated by digitally signing content;
generating a first block on a distributed ledger, the first block comprising the first trusted time stamp token and the first hash of first digitally signed content;
digitally signing the first trusted time stamp token with a second digital signature to generate a digitally signed first time stamp token;
generating a second hash of the digitally signed first time stamp token;
receiving a second trusted time stamp token from the trusted timing authority in response to transmitting the second hash to the trusted timing authority; and generating a second block on the distributed ledger, the second block comprising the second trusted time stamp token, the second hash of the digitally signed first time stamp token, and a hash of the first block;
wherein verification of data integrity of the digitally signed content is provided via the first hash of the digitally signed content and second hash of the digitally signed first time stamp token and via the hash of the first block and a hash of the second block.

15. The method of claim 14, wherein the event comprises a first event, further comprising:
retrieving a second time-based message, the second time-based message comprising the second trusted time stamp token;
digitally signing the second trusted time stamp token with a third digital signature to generate a digitally signed second time stamp token;
generating a third hash of the digitally signed second time stamp token;
transmitting the third hash to the trusted timing authority;
receiving a third trusted time stamp token from the trusted timing authority in response to transmitting the third hash;
generating a third block on the distributed ledger, the third block comprising the third trusted time stamp token, the third hash of the digitally signed second time stamp token, and the hash of the second block; and
generating a third time-based message, the third time-based message comprising the third trusted time stamp token.

16. The method of claim 14, wherein the first time-based message comprises a Signerinfo type that is an identifier of a digest algorithm used to generate the first hash.

17. The method of claim 14, wherein the first time-based message comprises a Signerinfo type that contains the hash of the first block and the hash of the second block.

18. The method of claim 14, wherein digitally signing the first time stamp token with the second digital signature further comprises: transmitting the first trusted time stamp token to a signer computing system that generated the first digitally signed content, and receiving the digitally signed first trusted time stamp token, digitally signed by the signer computing system.

19. The method of claim 14, further comprising generating, upon an occurrence of the event, an event journal entry, the event journal entry representing the occurrence of the event with the digitally signed content and comprises a signifier of the first time-based message associated with the event.

20. The method of claim 14, further comprising generating a second time-based message, the second time-based message comprising the second trusted time stamp token,
wherein the second time-based message further comprises a bundled certificate identifier that comprises a signed attribute bound to the first trusted time stamp token, the bundled certificate identifier comprising a certificate issuer and a certificate identifier.

* * * * *